July 1, 1924.
E. E. MULLINIX
FIRE ESCAPE
Filed Feb. 6, 1923
1,499,588
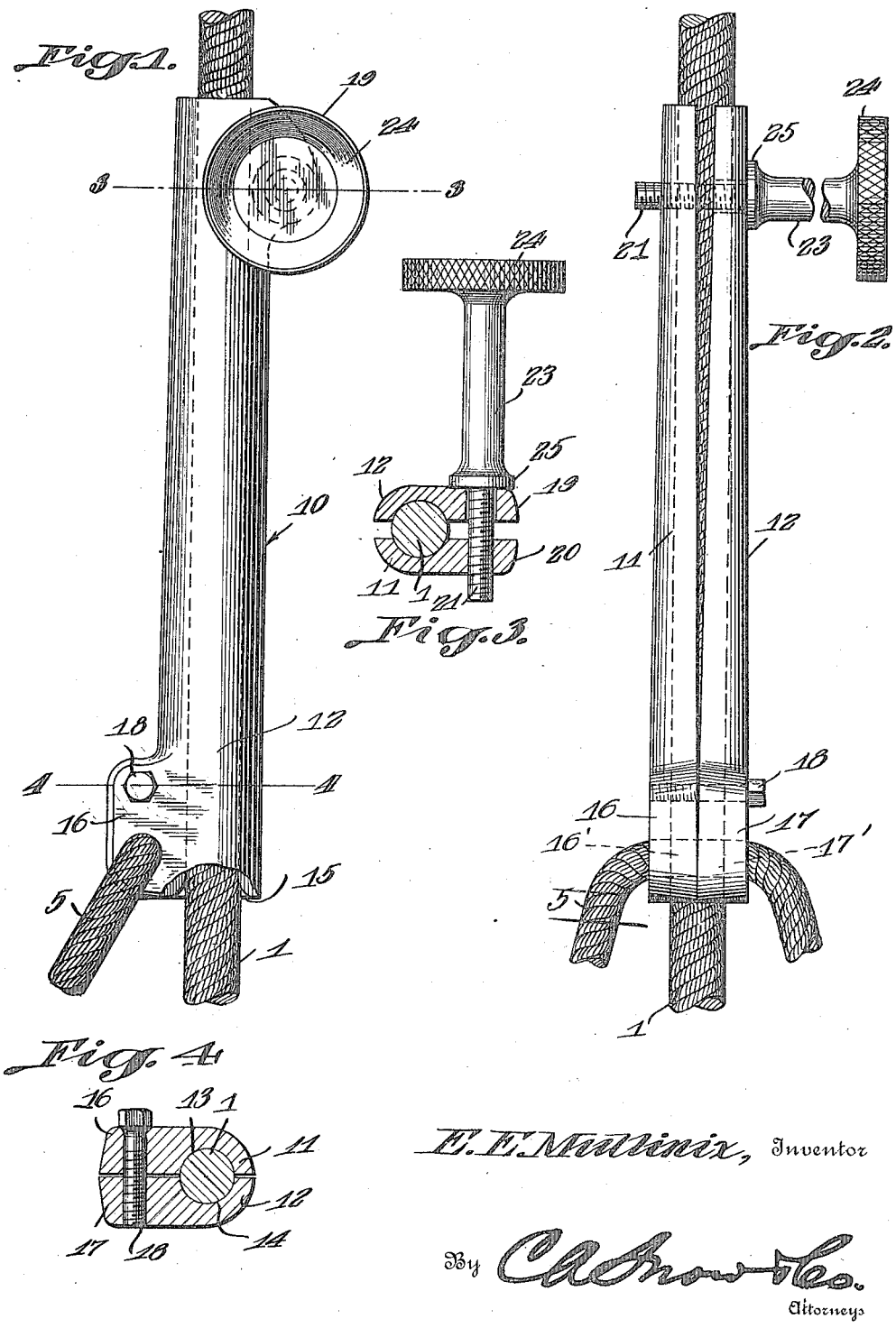
E. E. Mullinix, Inventor
By [signature], Attorneys Patented July 1, 1924.

1,499,588

UNITED STATES PATENT OFFICE.

ELMER ELLSWORTH MULLINIX, OF BURLINGTON, KANSAS.

FIRE ESCAPE.

Application filed February 6, 1923. Serial No. 617,301.

*To all whom it may concern:*

Be it known that I, ELMER E. MULLINIX, a citizen of the United States, residing at Burlington, in the county of Coffey and State of Kansas, have invented a new and useful Fire Escape, of which the following is a specification.

This invention relates to fire escapes, and more particularly to those of the rope gripping character.

The object of the invention is to provide a suspension device constructed for sliding engagement with a rope or cable and equipped with means to grippingly engage said rope whereby the user may control the speed of his descent and ride down the rope to safety.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of the suspension device shown applied with parts broken out;

Fig. 2 is a similar view taken in a plane at right angles to Fig. 1;

Fig. 3 is a transverse section taken on the line 3—3 of Fig. 1; and

Fig. 4 is a similar view taken on the line 4—4 of Fig. 1.

In the embodiment illustrated, the device constituting this invention comprises a rope or cable 1 which is designed to be anchored to a suitable support and on which a person may ride to safety when employing the clamp constituting a part of this invention.

A body encircling member 5 is designed to be passed around the body of the user under the arms and is connected with a clamp 10 slidably mounted on the cable 1.

The clamp 10 is constructed of two jaws 11 and 12 made in the form of castings having grooves 13 and 14 on their inner faces and which are designed to receive the cable 1 when the clamp is applied. These grooves 13 and 14 decrease in depth from the lower end of the clamp toward the upper end thereof and at their lower ends have a flared mouth 15 to facilitate the free downward sliding of the clamp on the cable.

The jaws 11 and 12 are provided respectively with laterally extending apertured lugs 16 and 17 provided with registering apertures 16' and 17' to receive the suspension member 5 shown clearly in Figs. 1 and 2. These lugs 16 and 17 are also apertured to receive a connecting bolt 18, the lug 17 having a threaded aperture and the lug 16 an unthreaded aperture, the bolt 18 having threaded engagement with the aperture in the lug 17 whereby the jaws are connected at their lower ends. The grooves or seats in the jaws at the lower ends thereof are of a size to permit the free sliding of the clamp on the cable 1 without abrasion thereof.

These jaws 11 and 12 are provided at their upper ends with laterally extending lugs 19 and 20 which project in a direction opposite to the lugs 16 and 17, the aperture in lug 20 being threaded and that in lug 19 unthreaded for the passage therethrough of a clamp screw 21. This screw 21 has a stem or shank 23 with a knurled head 24 at its outer end and a flange 25 at its inner end, the flange 25 being designed to bear against the lug 19 so that when said screw is turned outwardly, the jaws 11 and 12 will be moved toward each other into clamping engagement with the cable 1.

In the use of this device, the clamp being applied to the cable as shown in Figs. 1 and 2 and the suspension belt or body encircling member 5 positioned around the user under his arms, the screw 21 is slowly loosened to move the jaws 11 and 12 away from each other a sufficient distance to permit the clamp to slide slowly down the cable, the weight of the user operating to cause this movement.

Owing to the fact that the member 5 encircles the body of the user, he may employ his left hand to grasp the clamp 10, while his right hand may be used for controlling the speed of his descent by regulating the gripping action of the jaws on the cable incident to the screwing up or unscrewing of the screw 21.

It will thus be seen that a clamp constructed as herein shown and described will be strong, and reliable in operation, and easily controlled by the user.

Various changes in the form, shape, proportion and other minor details of construction may be made without departing from the principle or sacrificing any of the advantages of the claimed invention.

I claim:—

A cable clamp for fire escapes comprising a pair of jaws in the form of elongated semi-cylindrical castings having longitudinally extending grooves on their inner faces, the grooves tapering in depth toward one end of the clamp, the depth of the grooves at the lower ends of the castings being deep enough to permit the clamp to slide freely on the cable in connection with which it is to be used, apertured lugs extending from one side edge of the castings near their lower ends and designed to support a body encircling member, means detachably connecting said lugs, other lugs at the upper ends of the castings on the opposed side edges thereof to those carrying the first mentioned lugs, and a controlling screw mounted in the upper lugs for varying the clamping action of the jaws on the cable.

In testimony that I claim the foregoing as my own, I have hereto affixed my signature in the presence of two witnesses.

ELMER ELLSWORTH MULLINIX.

Witnesses:
B. D. HARRELD,
MATTIE HUTCHINGS.